(12) United States Patent
Yang et al.

(10) Patent No.: US 10,175,525 B2
(45) Date of Patent: Jan. 8, 2019

(54) POLARIZING WAVEGUIDE PLATE

(71) Applicants: Deng-Ke Yang, Hudson, OH (US);
Alireza Moheghi, Kent, OH (US);
Hossein Nemati, Kent, OH (US)

(72) Inventors: Deng-Ke Yang, Hudson, OH (US);
Alireza Moheghi, Kent, OH (US);
Hossein Nemati, Kent, OH (US)

(73) Assignee: The University of Akron, Akron, OH (US)

( * ) Notice: Subject to any disclaimer, the term of this patent is extended or adjusted under 35 U.S.C. 154(b) by 0 days.

(21) Appl. No.: 14/738,392

(22) Filed: Jun. 12, 2015

(65) Prior Publication Data

US 2015/0362649 A1 Dec. 17, 2015

Related U.S. Application Data

(60) Provisional application No. 62/011,435, filed on Jun. 12, 2014.

(51) Int. Cl.
*G02F 1/1335* (2006.01)
*G02F 1/1334* (2006.01)
(Continued)

(52) U.S. Cl.
CPC ..... *G02F 1/133528* (2013.01); *G02B 5/3016* (2013.01); *G02B 6/0056* (2013.01);
(Continued)

(58) Field of Classification Search
CPC ............ G02F 1/1334; G02F 1/133615; G02F 1/133606; G02F 1/133611; G02F 1/133603; G02F 1/133528; G02F 1/13362; G02F 1/133504; G02F 1/133524; G02F 1/1326; G02F 1/133305; G02F 1/1333; G02F 1/133362; G02F 1/135; G02F 1/1335;
(Continued)

(56) References Cited

U.S. PATENT DOCUMENTS 5,825,543 A * 10/1998 Ouderkirk ............ G02B 5/3008
252/585
7,072,544 B2 * 7/2006 Cornelissen ......... G02B 6/0056
385/11
(Continued)

*Primary Examiner* — Thoi Duong
(74) *Attorney, Agent, or Firm* — Renner Kenner Greive Bobak Taylor and Weber; Ray L. Weber; Timothy A. Hodgkiss

(57) ABSTRACT

A polarizing waveguide plate includes a pair of spaced transparent plates that define a gap therebetween. Disposed within the gap is a composite material formed of a mixture of polymer mater and liquid crystal material. Positioned proximate to one edge of the gap is an edge light, while a reflector/converter is positioned proximate to another edge of the gap. During operation, unpolarized light is emitted from the edge light and is received within the gap. As such, a portion of the light polarized in a first direction is permitted to exit the waveguide, while the remaining portion of the light that is polarized in a second direction, orthogonal to the first direction, is converted by the converter/reflector so that its polarization is also in the first direction. As such, substantially all of the unpolarized light from the edge light is emitted by the polarizing waveguide plate as polarized light.

18 Claims, 6 Drawing Sheets

(51) Int. Cl.
  *G02F 1/1337*   (2006.01)
  *G02F 1/1343*   (2006.01)
  *G02B 5/30*     (2006.01)
  *G02B 27/28*        (2006.01)
  *F21V 8/00*         (2006.01)

(52) U.S. Cl.
  CPC ........ *G02F 1/1334* (2013.01); *G02F 1/13439* (2013.01); *G02F 1/133524* (2013.01); *G02F 1/133723* (2013.01); *G02B 6/0031* (2013.01); *G02B 6/0055* (2013.01); *G02B 6/0066* (2013.01); *G02B 27/286* (2013.01); *G02F 2001/133531* (2013.01); *G02F 2001/133738* (2013.01)

(58) Field of Classification Search
  CPC ......... G02F 1/133553; G02F 1/133536; G02F 1/1336; G02F 1/133605; G02F 1/155; G02B 6/0051; G02B 6/0056; G02B 6/0011; G02B 6/0031; G02B 6/0025
  USPC ....... 349/65, 62, 61, 64, 96, 86, 9, 113, 112, 349/67; 362/606, 97.1, 97.2, 19, 611, 362/612, 551, 561, 608, 609, 615
  See application file for complete search history.

(56) References Cited

U.S. PATENT DOCUMENTS

| | | | |
|---|---|---|---|
| 2003/0067579 A1* | 4/2003 | Inoue | G02F 1/133788 349/187 |
| 2007/0103910 A1* | 5/2007 | Brickey | G02B 5/0242 362/311.04 |
| 2010/0085510 A1* | 4/2010 | Okuyama | G02F 1/133615 349/65 |

* cited by examiner

POLARIZING WAVEGUIDE PLATE

CROSS-REFERENCE TO RELATED APPLICATION

This application claims the benefit of U.S. Provisional Application No. 62/011,435 filed Jun. 12, 2014, the contents of which are incorporated herein by reference.

TECHNICAL FIELD

The present invention relates generally to a polarizing waveguide plate for use with edge-lit displays, such as liquid crystal displays (LCDs). In particular, the present invention relates to a polarizing waveguide plate for converting unpolarized light having two orthogonal planes of polarization into light having substantially the same plane of polarization upon exiting the polarizing waveguide plate.

BACKGROUND OF THE INVENTION

Many computer monitors and mobile devices utilize edge-lit liquid crystal displays (LCDs), as a source of illumination as they are compact and lightweight. The structure of such typical edge-lit liquid crystal display 10 is shown in FIG. 1. As such, unpolarized light is produced by an edge light 20 that is provided by the display 10, whereby light 30 enters a waveguide or waveguide diffuser plate 40, which is typically formed from plastic or glass for example, which has a refractive index that is higher than the surrounding air. In addition, the display 10 also includes mirrors 50 to enable the reflection of light 30 out of the waveguide diffuser plate 40. The conventional display 10 also includes a plurality of other layers that are disposed upon the waveguide diffuser plate 40, including a base polarizer film 60, a bottom substrate layer 70, a liquid crystal material layer 80, a top substrate layer 90, and a top polarizer film 92.

Thus, during operation of the display 10, when the light 30 generated by the edge light 20 hits or strikes the interface between the waveguide 40 and the environmental or surrounding air with a small incident angle, the light 30 comes out of, or is emitted by, the waveguide diffuser plate 40. Alternatively, when light 30 hits the interface between the waveguide 40 and environmental or surrounding air with a large incident angle, the light 30 is totally reflected by the interface and continues to propagate within the waveguide diffuser plate 40 where the light is reflected by the mirrors 50 out of the waveguide diffuser plate 40. When the light 30 hits or strikes the air/waveguide diffuser plate 40 interface at another location with a small incident angle, the light 30 also comes out of, or is emitted from, the waveguide diffuser plate 40. Thus, light 30 that is produced by the edge light 20 is unpolarized, and generally spreads out and exits the waveguide diffuser plate 40. Specifically, such diffused light emitted by the waveguide 40 is identified by reference numeral 30 in FIG. 1. Next, the unpolarized light 30 that exits the waveguide diffuser plate 40 is passed through a polarizer film 60 or other polarization device. The polarizer film 60 operates, such that half of the unpolarized light 30 is linearly polarized (referred to by numeral 30A), and is permitted to pass out of the polarizer 60, while the other half of the unpolarized light 30 (i.e. unpolarized portion) is absorbed by the polarizer 60, and as such, it does not pass out of the polarizer 60. Therefore, in conventional display designs, such as that of display 10, which utilizes an edge light 20, half of the light 30 produced by the edge light 20 is wasted due to its absorption by the polarizer 60. As a result of the lost light intensity, the conventional display 10 produces a dimmed image, or requires the use of an edge light 20 that is larger and consumes more power to compensate for the reduction in light intensity due to the absorption of light 30 by the polarizer 60.

Therefore, there is a need for a polarizing waveguide plate of the present invention that is configured so that unpolarized light produced by an edge light, which propagates through the diffuser plate with one linear polarization (i.e. the first polarization) is scattered out of the waveguide and toward a liquid crystal panel display (LCD), while the light with a polarization to orthogonal to the first polarization (i.e. the second polarization) that is not scattered, or is weakly scattered, is converted, so as to be approximately linearly polarized with the light of the first polarization and reflected out of the waveguide plate and toward the LCD display. In addition, there is a need for a polarizing waveguide plate of the present invention that is configured to increase the light efficiency of edge-lit displays, such as LCD (liquid crystal display) devices. Furthermore, there is a need for a polarizing waveguide plate of the present invention that enhances the intensity of the light emitted from the waveguide.

SUMMARY OF THE INVENTION

One aspect of the present invention is to provide a polarizing waveguide plate that includes a pair of spaced, substantially parallel transparent plates, defining a cell therebetween; a composite mixture of liquid crystal material and polymer material disposed in the cell; an edge light to emit an unpolarized light into the open cell, whereupon it is directly incident on the composite mixture, such that the composite mixture scatters at least a first portion of the unpolarized light out of the diffuser plate with polarization in a first direction; a converter/reflector disposed substantially opposite to the edge light, so as to convert the remaining portion of the unscattered light into the first direction and reflect it back into the cell, whereupon it is scattered out of the plate with polarization in the first direction, such that all of the unpolarized light entering the cell is polarized in the first direction.

It is another aspect of the present invention to provide a polarizing waveguide plate for converting unpolarized light from an edge light into polarized light, the waveguide diffuser plate comprising a pair of substantially light transparent sections, the plates spaced apart to define a gap therebetween; a composite material that includes liquid crystal material and polymeric material disposed in the gap; and a converter/reflector positioned proximate to one edge of the gap; wherein the edge light is configured to be positioned proximate to another edge of the gap, so as to allow unpolarized light emitted from the edge light to be incident on the composite mixture and to enter the gap, whereupon one portion of the unpolarized light having a first polarization exits through the light transparent sections, and a second portion of the light having a second polarization, different from the first polarization, is converted, upon contact with the converter/reflector, into the first polarization and reflected to exit through the light transparent sections.

BRIEF DESCRIPTION OF THE DRAWINGS

These and other features and advantages of the present invention will become better understood with regard to the following description, appended claims, and accompanying drawings wherein:

DETAILED DESCRIPTION OF THE INVENTION

Figure 1:
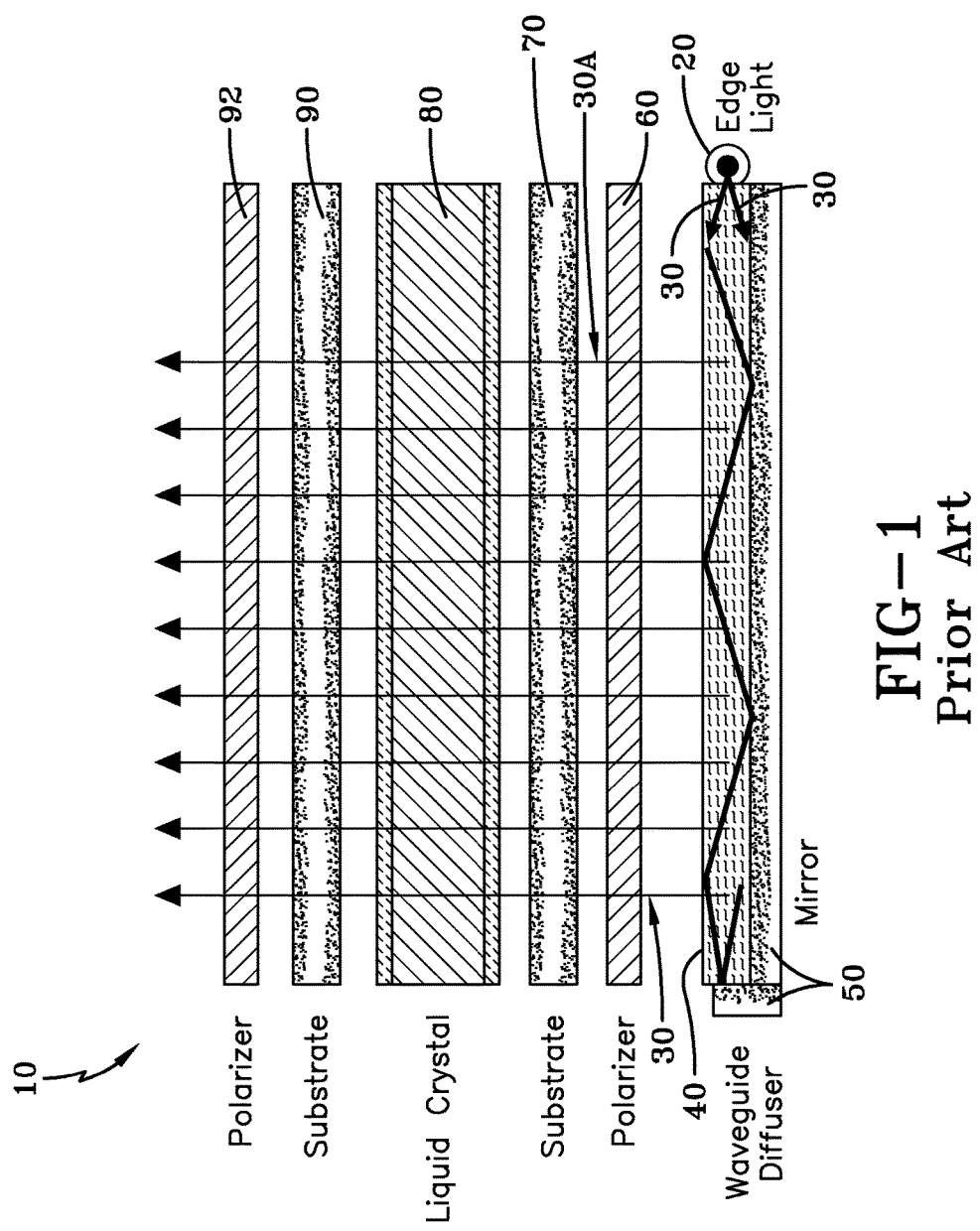
FIG. 1 is a schematic structure of a prior art edge-lit liquid crystal display.
Figure 2:
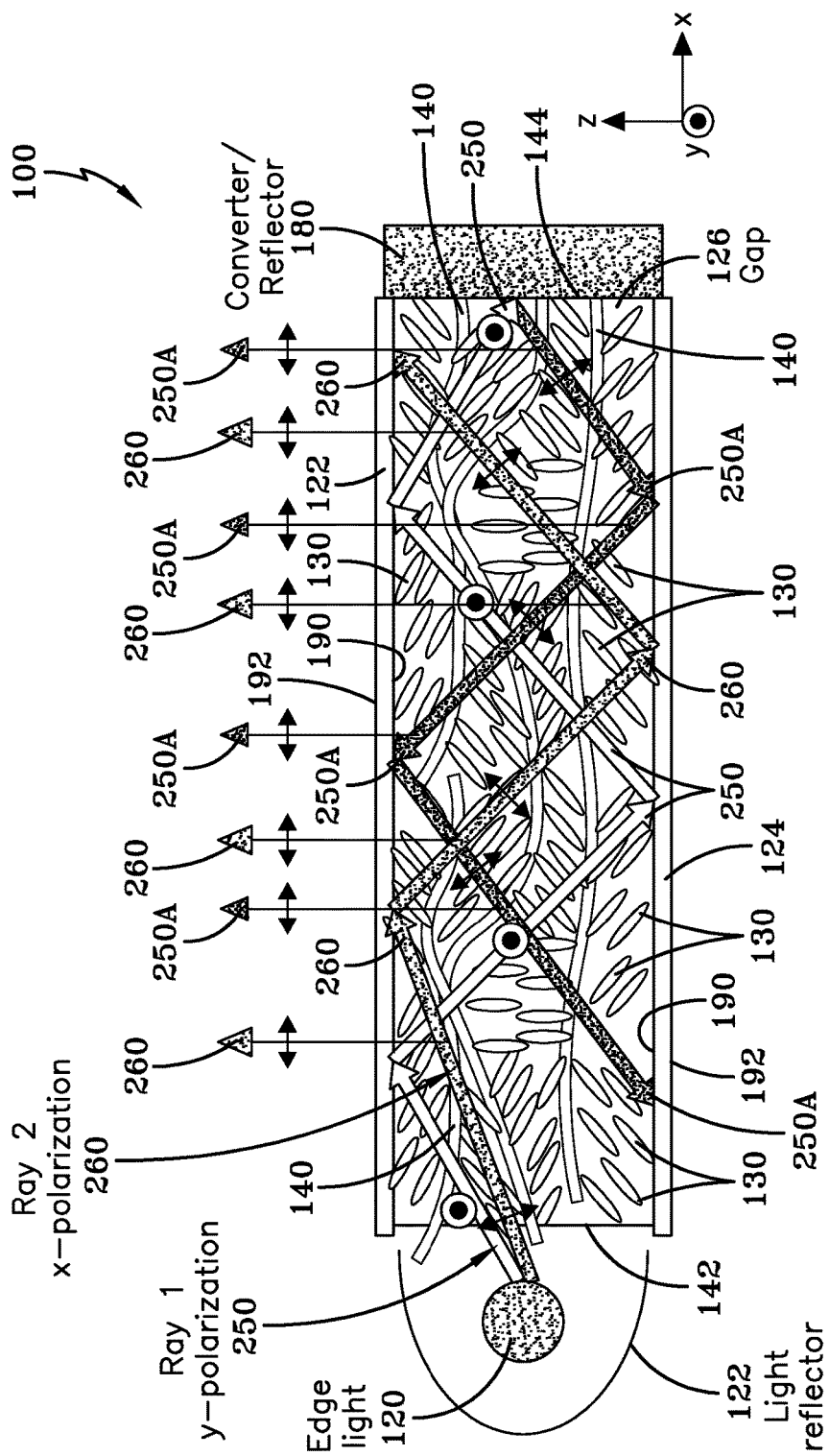
FIG. 2 is a schematic structure of a polarizing waveguide plate in accordance with the concepts of the present invention.

A polarizing waveguide plate or film is generally referred to by numeral 100, as shown in FIG. 2 of the drawings. The waveguide plate 100 generates polarized light when used with an edge light source 120 that produces unpolarized light. The edge light source 120 may comprise any suitable light source, such as an LED (light emitting diode), as well as any suitable incandescent, electroluminescent, or chemoluminescent light source for example. The waveguide diffuser plate 10 may also include a light reflector 121, such as a mirror, which is used to reflect light that is generated by the edge light source 120 toward the plate 100. The plate 100 includes a pair of film or plate sections (i.e. substrates) 122 and 124 that are spaced apart to form a gap 126 therebetween. It should be appreciated that the film or plate sections 122,124 may be formed of any suitable material, such as an at least partially transparent material, including glass or plastic for example. In other embodiments, the film or plate sections 122 and 124 are substantially parallel to each other, but may be arranged in any suitable orientation to one another. In one embodiment, the film or plate sections 122,124 may be formed of rigid or flexible material. It should be appreciated that in other embodiments, the film or plate sections 122,124 may be pre-formed to have any desired shape. Furthermore, in other embodiments, the film or plate sections 122,124 may have any suitable cross-sectional shape, such as a rectilinear or curvilinear shape, or a combination of both. Still, in other embodiments, the plate sections or substrates 122,124 may comprise an at least partially light transparent material, which is also electrically conductive, and capable of receiving an applied voltage from any suitable voltage source, including an AC (alternating current) or DC (direct current) voltage source. For example, the plate sections 122,124 may comprise indium-tin-oxide (ITO). As such, the film sections 122 and 124, together with the gap 126, include a receiving edge 142 and back edge 144 of the diffuser plate 100. In some embodiments, the receiving edge 142 is substantially opposite to the rear edge 144. As such, the edge light source 120 is positioned adjacent to the receiving edge 142, while a converter/reflector 180 is positioned adjacent to the rear edge 144, such that the edge light 120 and the converter/reflector 180 are positioned so as to be substantially opposite to one another.

Continuing, the light source 20 generates unpolarized light that is permitted to enter the gap 126, so as to pass into a composite material formed of LC and polymer that is disposed in the gap 126, which will be discussed in detail below. Furthermore, it should be appreciated that the film or plate sections 122 and 124 each include an inner and outer surface 190 and 192, such that the outer surface 190 is positioned so as to be exposed to environmental air, while the inner surface 192 is positioned so as to be proximate to the composite liquid crystal/polymer material to be discussed. In other words, the film sections 122 and 124 each define a film/air interface of the waveguide diffuser plate 100. Furthermore, in some embodiments, the inner surface 192 of one or more of the film or plate sections 122,124 includes a layer of indium-tin-oxide (ITO). In addition, a layer of polyimide may be disposed upon the ITO layers, and rubbed to form homogeneous alignment of the liquid crystals in the composite material to be discussed. It should be appreciated that in some embodiments of the polarizing plate 100, one of the plate sections 122,124 may be opaque while the other section 122,124 is at least partially light transparent. It should also be appreciated that in some embodiments of the plate 100, a mirror or other reflective surface may be positioned proximate to either of the plate sections 122,124.

Disposed within the gap 126 of the diffuser plate 10 are poly-domains of liquid crystal material 130 with a dispersed polymer 140, which together forms a composite material 199. The orientation of the liquid crystal (LC) material 130 is mainly random in the x-z plane, where the z-axis is perpendicular to the diffuser film or plate 10, and the x-axis is parallel to the film 10.

The unpolarized light produced by the edge light source 120, which is received by the diffuser plate 100, can be decomposed into two linear polarized light rays, ray 1, identified by reference numeral 250, and ray 2, identified by reference numeral 260, which are polarized along the y and x directions, respectively. That is, light ray 1 (250) is polarized in the y-direction and light ray 2 (260) is polarized in the x-direction. As such, both of the light rays 250,260 enter the diffuser film or plate 100 at the receiving edge 142 within certain angle regions, such that when the rays 250, 260 hit, or otherwise contact, the film/air interfaces associated with each of the film sections 122,124 with a large incident angle, the rays 250 and 260 are totally reflected by such film/air interfaces. As such, the light rays 250,260 bounce between the two film/air interfaces that are formed by film sections 122,124, so as to propagate through the plate 100. Specifically, as ray 2 (260) propagates through the film 100, it encounters different refractive indices in the different liquid crystal domains of the composite material 199, which cause ray 2 (260) to be scattered. The scattering of ray 2 (260) causes ray 2 to hit the film/air interfaces associated with the film sections 122,124 with a small incident angle, which allows ray 2 (260) to exit the polarizing waveguide plate 100. As ray 1 (250) propagates through the polarizing waveguide plate 100, its polarization in the y-direction remains perpendicular to the liquid crystal material 130 and encounters the same refractive index $n_o$. As such, the polarizing waveguide plate 100 is a uniform optical medium for ray 1 (250). As such, light ray 1 (250) is able to propagate through the plate 100 from the entrance edge 142 through the composite material 199 without being scattered out of the polarizing waveguide plate 100. Once light ray 1 (250) reaches the rear edge 144 of the film 100, light ray 1 (250) encounters, or is otherwise incident on, the combination converter/reflector 180. It should be appreciated that the converter/reflector 180 is configured to both reflect light that is incident thereon, while converting the polarization of the incident light in a manner discussed herein. It should be appreciated that the converter/reflector 180 may comprise optical retardation film, or the like, and any suitable mirrored material. As a result of being incident on the combination converter/reflector 180, light ray 1 (250) bounces back (or reflects), whereupon the polarization of light ray 1 (250) is changed from the y-direction into the x (or z)-direction, such that polarized light ray 1 is denoted by reference numeral 250A. When this polarized light ray 1 (250A) propagates through the film 100, light ray 1 (250A) encounters different refractive indices in different liquid crystal domains of the composite material 199, whereupon the polarized light ray 1 (250A) is scattered, so as to hit the film-air interface formed by films 122,124 with a small incident angle, such that the polarized light ray 1 (250A) exits the film 100. In other words, the combination converter/reflector 180 operates to change the y-direction polarization of the light ray 1 into a substantially x-direction polarization. Therefore, substantially all the light from the edge light 120, which includes light ray 250A (polarized light ray 1) and light ray 260 (light ray 2) coming or exiting out of the diffuser film 100 is linearly polarized substantially along the x-direction. In other words, the combination converter/reflector 180 converts the polarization of ray 1 in the y-direction into an x-direction polarization that substantially matches the polarization of light ray 2, which is also polarized in the x-direction, and as a result substantially all of the unpolarized light that enters the waveguide plate 100 from the edge light 120 is permitted to exit the waveguide plate 100 as polarized light.

Example 1

In one embodiment, the polarizing waveguide plate 100 was formed using a composite material 199 formed from a mixture of 95.7% liquid crystal E44, 3.9% monomer HCM-009 and 0.4% photo-initiator BME (benzoin-methylether). The composite material mixture 199 was filled into an approximately 10 micron thick cell gap 126 that was formed of two parallel glass substrates 122,124, that each include an ITO (indium-tin-oxide) coating on their inner surface 190. Specifically, the inner surface 190 of the substrates 122,124 was coated with PI2555 (polyimide) and rubbed for homogeneous alignment of the liquid crystals 130 of the composite material 199. The cell or waveguide 100 was then irradiated by UV (ultra-violet) light to polymerize the monomer of the composite material 199. During the polymerization process, the cell or waveguide plate 100 was first irradiated for about 14 minutes without applying a voltage across the substrates 122,124 of the plate 100, and then irradiated for about 30 minutes with 50 volts being applied across the substrates 122,124 of the plate 100. The UV intensity was about 1.4 mW/cm$^2$.

Figure 3:
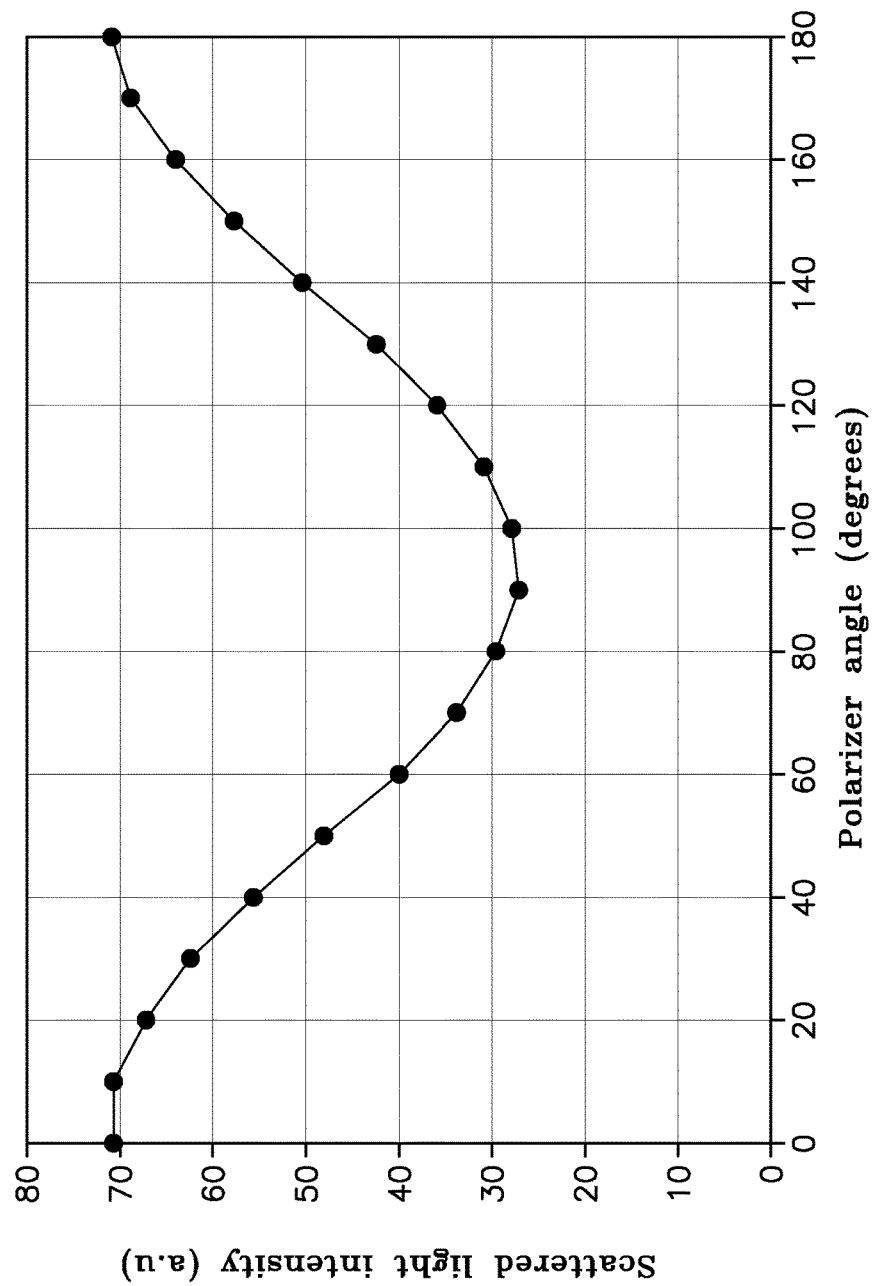
FIG. 3 is a graph showing scattered light intensity as a function of the polarizer angle defined with respect to the alignment layer rubbing direction in accordance with the concepts of the present invention.
Figure 4:
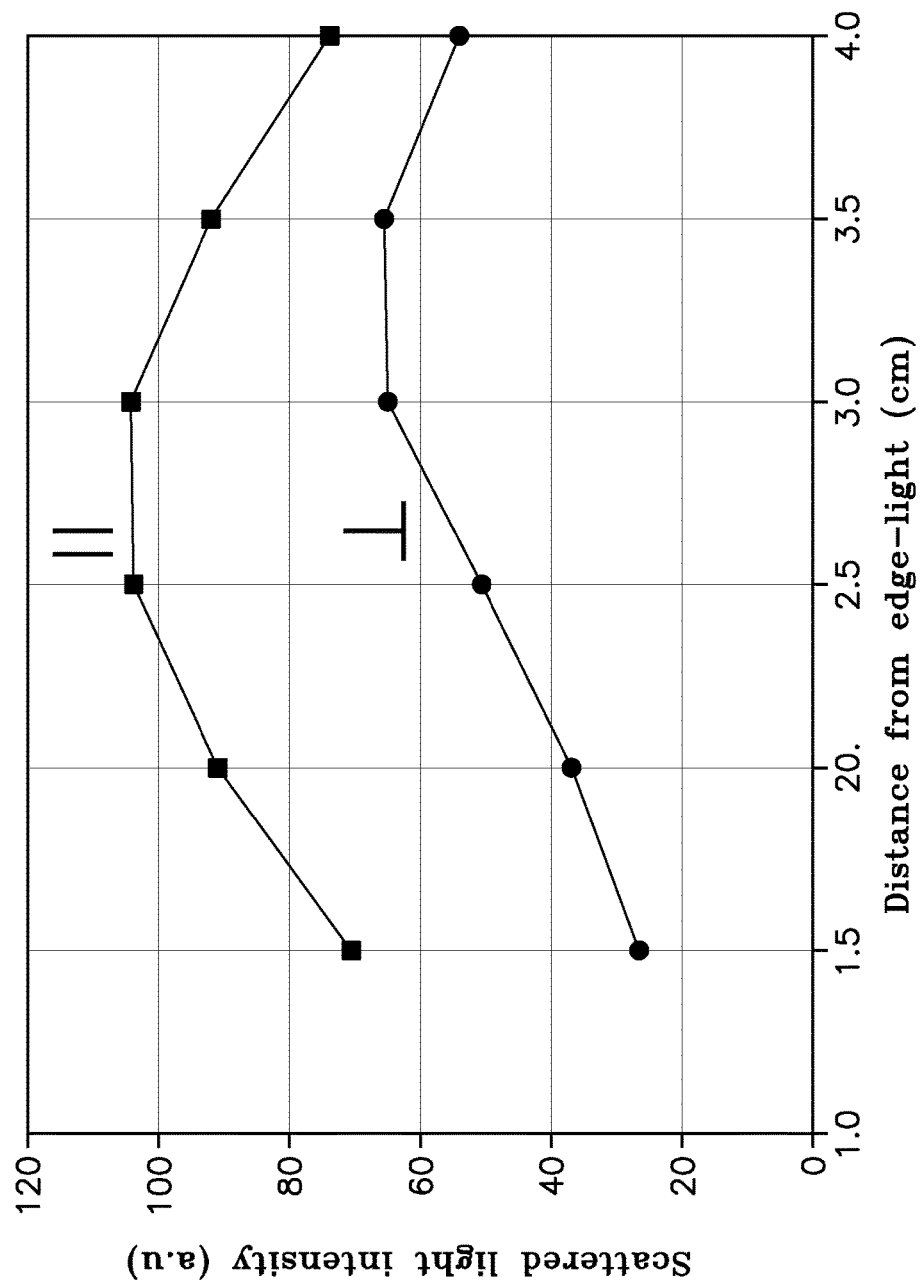
FIG. 4 is a graph showing scattered light intensity as a function of distance of the cell from the edge light in accordance with the concepts of the present invention.

Next, an LED (light emitting diode) edge light was installed on the cell or waveguide plate 100 to measure its scattered light intensity. To complete such measurements, a linear polarizer was placed between the cell or waveguide plate 100 and the detector. The light intensity of the plate 100 as a function of orientation angle of the polarizer is shown in FIG. 3. When the angle of the polarizer was about 0° (parallel to the liquid crystal plane), the light intensity was high. When the angle of the polarizer was about 90° (perpendicular to the liquid crystal plane), the intensity of the light was low, indicating that the light was partially polarized with its polarization parallel to the liquid crystal plane. The light intensity of the plate 100, as a function of the position from the edge light 120 on top of the waveguide plate 100 is shown in FIG. 4. As such, when the polarizer was parallel to the liquid crystal plane, the intensity of light was high, and when the polarizer was perpendicular to the liquid crystal plane, the intensity of light was low.

Example 2

In another embodiment, the polarizing waveguide plate 100 was formed using a composite material 199 formed from a mixture of 95.7% liquid crystal E44, 3.9% monomer HCM-009 and 0.4% photo-initiator BME (benzoin-methylether) was made to form the composite material 199. The mixture was filled into an approximately 9 micron thick cell gap 126 that was formed of two parallel glass substrates 122,124, that each include an ITO (indium-tin-oxide) coating on their inner surface 190. Specifically, the inner surface 190 of the substrates 122,124 of the cell or waveguide plate 100 was coated with PI2555 (polyimide), and rubbed for homogeneous alignment of the liquid crystals 130 of the composite material 199. The cell or waveguide 100 was then irradiated by UV (ultra violet) light to polymerize the monomer of the composite material 199 for about 30 minutes. During the polymerization process, no voltage was applied to the plate 100. The UV intensity was about 1.4 mW/cm$^2$.

Figure 5:
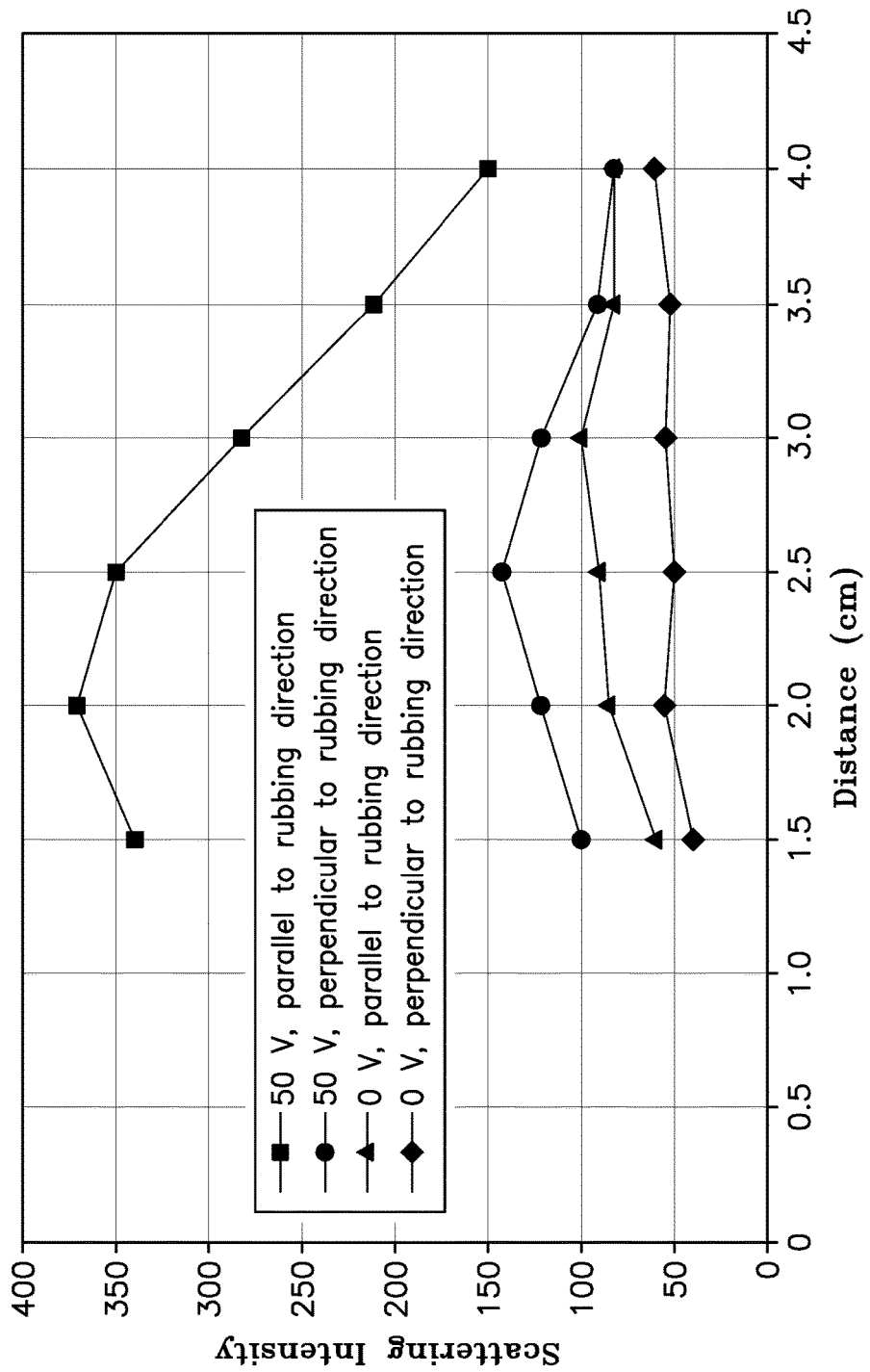
FIG. 5 is a graph showing the intensity of light scattered out of the cell of the polarizing waveguide plate of the present invention vs. the position of the cell in accordance with the concepts of the present invention.

Next, the edge light 120 was attached to the cell or polarizing waveguide plate 100 and the intensity of light coming out of the cell or waveguide plate 100 was measured at different positions relative to the edge light 120. To complete such measurements, a linear polarizer was placed between the cell or waveguide 100 and the detector, whereupon the results of such measurements are shown in FIG. 5. Specifically, when 0 volts was applied across the substrates 122,124 of the cell or waveguide 100, the intensity of the light coming from the cell or waveguide 100 was low, no matter if the polarizer was parallel or perpendicular to the rubbing direction of the ITO, thereby indicating that the material was not much scattering. When 50 volts was applied across the substrates 122,124 of the cell or waveguide 100, the intensity of the scattered light was much stronger. In this state, the intensity of the scattered light was much stronger when the polarizer was parallel to the rubbing direction than that when the polarizer was perpendicular to the rubbing direction. As such, the cell or waveguide 100 functions as a switchable polarizing waveguide diffuser plate in accordance with the concepts of the present invention. It should be appreciated that any suitable voltage may be applied across the substrates 122,124 to achieve the desired light scattering intensity level.

Figure 6:
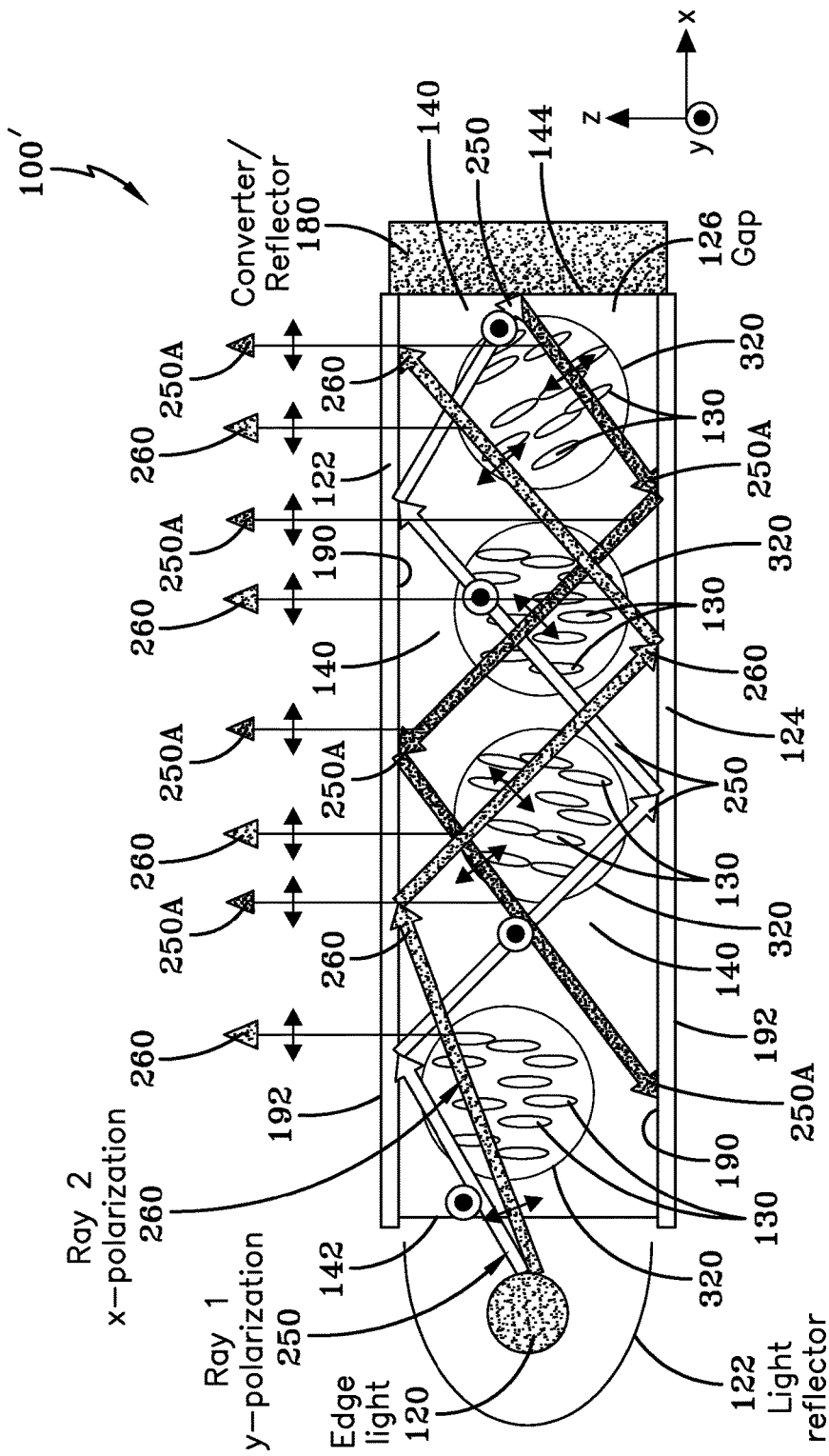
FIG. 6 is an alternative schematic structure of a polarizing waveguide diffuser plate in accordance with the concepts of the present invention.

In another embodiment, the polarizing waveguide plate 100' may be configured, as shown in FIG. 6 of the drawings. Specifically, the waveguide plate 100 may be configured with an alternative composite material 300, whereby the liquid crystal material 130 is encapsulated in one or more droplets 320, such that the droplets 320 are suspended in a polymeric material 140.

It should be appreciated that in some embodiments, the gap 126 may have a dimension between about 1 to 100 um, however the gap 126 may have any suitable dimension.

Therefore, one advantage of the preset invention is that a polarizing waveguide plate provides enhanced light intensity output using an unpolarized light source. Still another advantage of the preset invention is that the polarizing waveguide plate is inexpensive to fabricate.

Thus, it can be seen that the objects of the present invention have been satisfied by the structure and its method for use presented above. While in accordance with the Patent Statutes, only the best mode and preferred embodiments have been presented and described in detail, with it being understood that the present invention is not limited thereto or thereby. Accordingly, for an appreciation of the true scope and breadth of the invention, reference should be made to the following claims.

What is claimed is:

1. A polarizing waveguide plate for converting unpolarized light into polarized light, the waveguide plate comprising:
   a composite material layer to receive the unpolarized light, the composite material layer including liquid crystal material in which polymeric material is dispersed therein, said liquid crystal material having a plurality of domains each having a different refractive index;
   a first section;
   an at least partially light transparent second section spaced apart from said first section to define a gap therebetween in which said composite material layer is disposed;
   wherein the composite material layer is configured so that a difference between said refractive indices of two or more said domains scatters the received unpolarized light such that one portion of the unpolarized light having a first polarization exits said composite material layer through said second section.

2. The polarizing waveguide plate of claim 1, wherein said sections comprise a film material.

3. The polarizing waveguide plate of claim 1, wherein said sections are substantially parallel.

4. The polarizing waveguide plate of claim 1, wherein said sections are flexible.

5. The polarizing waveguide plate of claim 1, wherein said composite material layer is formed from a liquid crystal material, a monomer and a photoinitiator.

6. The polarizing waveguide plate of claim 1, wherein said composite material layer has a thickness of about 1-100 um.

7. The polarizing waveguide plate of claim 1, wherein said sections include an inner surface proximate to said composite material, such that at least one of said inner surfaces has an alignment layer that provides homogeneous alignment to said liquid crystal material.

8. The polarizing waveguide plate of claim 7, wherein said alignment layer comprises a polyimide layer.

9. The polarizing waveguide plate of claim 1, wherein said second section and said first section are electrically conductive to receive a voltage applied thereto, such that as said voltage is adjusted, the orientation of said liquid crystal material is changed to control the intensity of said first polarization light that exits from said second section.

10. The polarizing waveguide plate of claim 1, further comprising a convertor/reflector positioned proximate to a surface of said composite material layer, wherein a second portion of the unpolarized light having a second polarization, different from said first polarization, is converted, upon contact with said converter/reflector, into said first polarization and reflected to exit through said second section.

11. The polarizing waveguide plate of claim 10, wherein said converter/reflector is positioned so as to be substantially opposite to an edge light that provides the unpolarized light.

12. The polarizing waveguide plate of claim 10, wherein said first polarization is orthogonal to said second polarization.

13. The polarizing waveguide plate of claim 1, wherein said first section is opaque.

14. A polarizing waveguide plate for converting unpolarized light into polarized light, the waveguide plate comprising:
   a composite material layer to receive the unpolarized light, the composite material layer including liquid crystal material encapsulated in one or more droplets that are suspended in polymeric material, said liquid crystal material having a plurality of domains each having a different refractive index;
   a first section;
   an at least partially light transparent second section spaced apart from said first section to define a gap therebetween, in which said composite material layer is disposed;
   wherein the composite material layer is configured so that a difference between said refractive indices of two or more said domains scatters the unpolarized light such that one portion of the unpolarized light having a first polarization exits from said composite material layer through said second section.

15. The polarizing waveguide plate of claim 14, wherein said second section and said first section are electrically conductive to receive a voltage applied thereto, such that as said voltage is adjusted, the orientation of said liquid crystal material is changed to control the intensity of said first polarization light that exits from said second section.

16. The polarizing waveguide plate of claim 14, further comprising a convertor/reflector positioned proximate to a surface of said composite material layer, wherein a second portion of the unpolarized light having a second polarization, different from said first polarization, is converted, upon contact with said converter/reflector, into said first polarization and reflected to exit through said second section.

17. The polarizing waveguide plate of claim 16, wherein said first polarization is orthogonal to said second polarization.

18. The polarizing waveguide plate of claim 14, wherein said first section is opaque.

* * * * *

UNITED STATES PATENT AND TRADEMARK OFFICE
CERTIFICATE OF CORRECTION

PATENT NO. : 10,175,525 B2  
APPLICATION NO. : 14/738392  
DATED : January 8, 2019  
INVENTOR(S) : Deng-Ke Yang, Alireza Moheghi and Hossein Nemati Page 1 of 1

It is certified that error appears in the above-identified patent and that said Letters Patent is hereby corrected as shown below:

On the Title Page

Item (73) - the Assignee - the words "The University of Akron, Akron, OH (US)" should read --KENT STATE UNIVERSITY, KENT, OH (US)--.

Signed and Sealed this  
Nineteenth Day of February, 2019

Andrei Iancu  
*Director of the United States Patent and Trademark Office*